United States Patent
Lee et al.

(10) Patent No.: US 10,281,035 B2
(45) Date of Patent: May 7, 2019

(54) ENTRAINED AIR DEFLECTOR FOR A HYDROSTATIC TRANSMISSION

(71) Applicant: Honda Motor Co., Ltd., Tokyo (JP)

(72) Inventors: Justin William Lee, Durham, NC (US); Eric Philip Mlcoch, Durham, NC (US); Robert Clifton Whitehead, Mebane, NC (US); Stephen Hang Shan, Chapel Hill, NC (US); Richard Brendon Huntley, Rutherfordton, NC (US)

(73) Assignee: Honda Motor Co., Ltd., Tokyo (JP)

( * ) Notice: Subject to any disclaimer, the term of this patent is extended or adjusted under 35 U.S.C. 154(b) by 93 days.

(21) Appl. No.: 15/471,442

(22) Filed: Mar. 28, 2017

(65) Prior Publication Data

US 2018/0283546 A1    Oct. 4, 2018

(51) Int. Cl.
| | |
|---|---|
| *F16H 61/40* | (2010.01) |
| *F16H 61/4174* | (2010.01) |
| *B60K 17/10* | (2006.01) |
| *B62D 51/00* | (2006.01) |
| *B62D 51/04* | (2006.01) |
| *E02F 9/20* | (2006.01) |
| *F16H 39/04* | (2006.01) |
| *F15B 21/044* | (2019.01) |
| *F16H 39/14* | (2006.01) |
| *F16H 59/68* | (2006.01) |

(52) U.S. Cl.
CPC ......... *F16H 61/4174* (2013.01); *B60K 17/10* (2013.01); *B62D 51/004* (2013.01); *B62D 51/007* (2013.01); *B62D 51/04* (2013.01); *E02F 9/202* (2013.01); *F15B 21/044* (2013.01); *F16H 39/04* (2013.01); *F16H 39/14* (2013.01); *F16H 61/40* (2013.01); *F16H 2059/6838* (2013.01)

(58) Field of Classification Search
CPC .......................... F16H 61/4174; F15B 21/044
USPC ..................................... 60/453, 488
See application file for complete search history.

(56) References Cited

U.S. PATENT DOCUMENTS

| | | | |
|---|---|---|---|
| 6,550,242 B2 | 4/2003 | Abend et al. | |
| 7,686,137 B2 | 3/2010 | Tominaga et al. | |
| (Continued) | | | |

FOREIGN PATENT DOCUMENTS

| | | |
|---|---|---|
| DE | 19727205 A1 | 12/1998 |
| DE | 20218576 U1 | 3/2003 |
| JP | 4940633 B2 | 5/2012 |

*Primary Examiner* — Michael Leslie
(74) *Attorney, Agent, or Firm* — Honda Patents & Technologies North America, LLC; Mark E. Duell

(57) ABSTRACT

A hydrostatic transmission for a working machine having a frame, an engine on the frame, and at least one wheel driven by the hydrostatic transmission is disclosed. The hydrostatic transmission includes a housing, a hydraulic pump, the hydraulic pump driven by an output shaft from the engine, a hydraulic motor for driving an output shaft connected to the at least one wheel, a first fluid line fillable with hydraulic fluid to be maintained under a first pressure, a second fluid line fillable with hydraulic fluid to be maintained under a second pressure, a first check valve for allowing hydraulic fluid to enter the first fluid line, a second check valve for allowing hydraulic fluid to enter the second fluid line, and an entrained air deflector for preventing hydraulic fluid entrained with air from entering the first check valve and the second check valve.

15 Claims, 19 Drawing Sheets

(56) References Cited

U.S. PATENT DOCUMENTS

| | | |
|---|---|---|
| 8,281,892 B2 * | 10/2012 | Sugimoto ............ B60K 17/105 |
| | | 180/307 |
| 8,464,610 B1 | 6/2013 | Langenfeld et al. |
| 8,534,060 B1 | 9/2013 | Bennett et al. |
| 8,662,724 B2 * | 3/2014 | Pastrick ............... B60Q 1/2665 |
| | | 362/494 |
| 9,109,684 B1 | 8/2015 | Langenfeld et al. |
| 9,453,519 B2 | 9/2016 | Saldiema et al. |
| 2015/0075155 A1 | 3/2015 | Murashima et al. |

* cited by examiner

US 10,281,035 B2

ENTRAINED AIR DEFLECTOR FOR A HYDROSTATIC TRANSMISSION

TECHNICAL FIELD

The embodiments disclosed herein are related to the field of hydrostatic transmissions.

BACKGROUND

Portable power equipment, such as snow blowers or similar apparatuses, typically use hydrostatic transmissions (HST) to operates. Due to cavitation within the HST, the HST loses efficiency due to air bubbles generated by the turning of the gears, particularly when the air bubbles get trapped in the check valve seats of the hydraulic circuit. Therefore, there is a need to prevent make-up oil entering through the check valve seats to be free of cavitation air bubbles.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a hydrostatic transmission for a working machine having a frame, an engine on the frame, and at least one wheel driven by the hydrostatic transmission includes a housing, a hydraulic pump, the hydraulic pump driven by an output shaft from the engine, a hydraulic motor for driving an output shaft connected to the at least one wheel, a first fluid line fillable with hydraulic fluid to be maintained under a first pressure, a second fluid line fillable with hydraulic fluid to be maintained under a second pressure, a first check valve for allowing hydraulic fluid to enter the first fluid line, a second check valve for allowing hydraulic fluid to enter the second fluid line, and an entrained air deflector for preventing hydraulic fluid entrained with air from entering the first check valve and the second check valve.

According to another aspect, a deflector for preventing air entrained fluid from entering first and second check valves includes a floor, the floor having an outer edge, the floor being positioned beneath the first check valve and the second check valve, and a wall extending perpendicularly upward from the outer edge of the floor, the wall radially surrounding the first check valve and the second check valve.

According to yet another aspect, a hydrostatic transmission for a working machine having a frame, an engine on the frame, and at least one wheel driven by the hydrostatic transmission includes a housing, a hydraulic pump, the hydraulic pump driven by an output shaft from the engine for pumping hydraulic fluid, a hydraulic motor for driving an output shaft connected to the at least one wheel, a first fluid line transporting hydraulic fluid between the hydraulic pump and the hydraulic motor under a first pressure, a second fluid line transporting hydraulic fluid between the hydraulic pump and the hydraulic motor under a second pressure, a first check valve for allowing hydraulic fluid to enter the first fluid line, and a deflector for preventing hydraulic fluid entrained with air from entering the first check valve.

The figures depict various embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
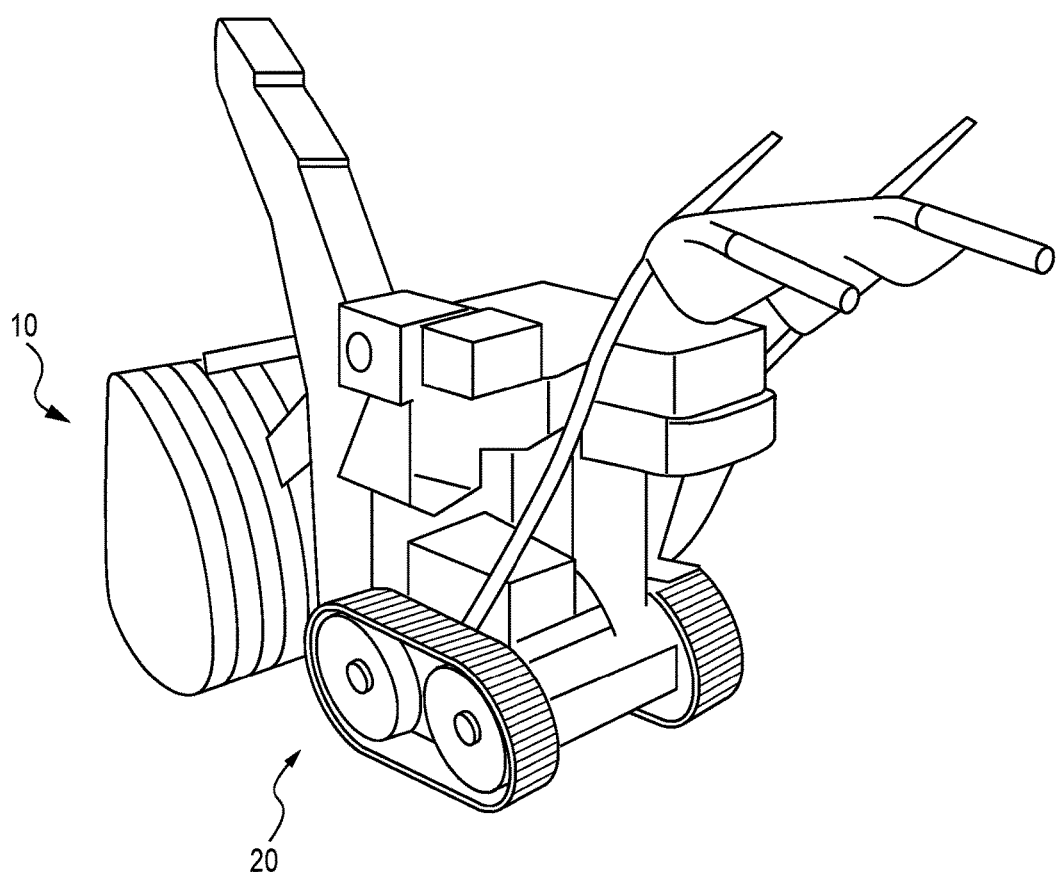
FIG. 1 is perspective view of a portable power equipment apparatus employing a hydrostatic transmission.
Figure 2:
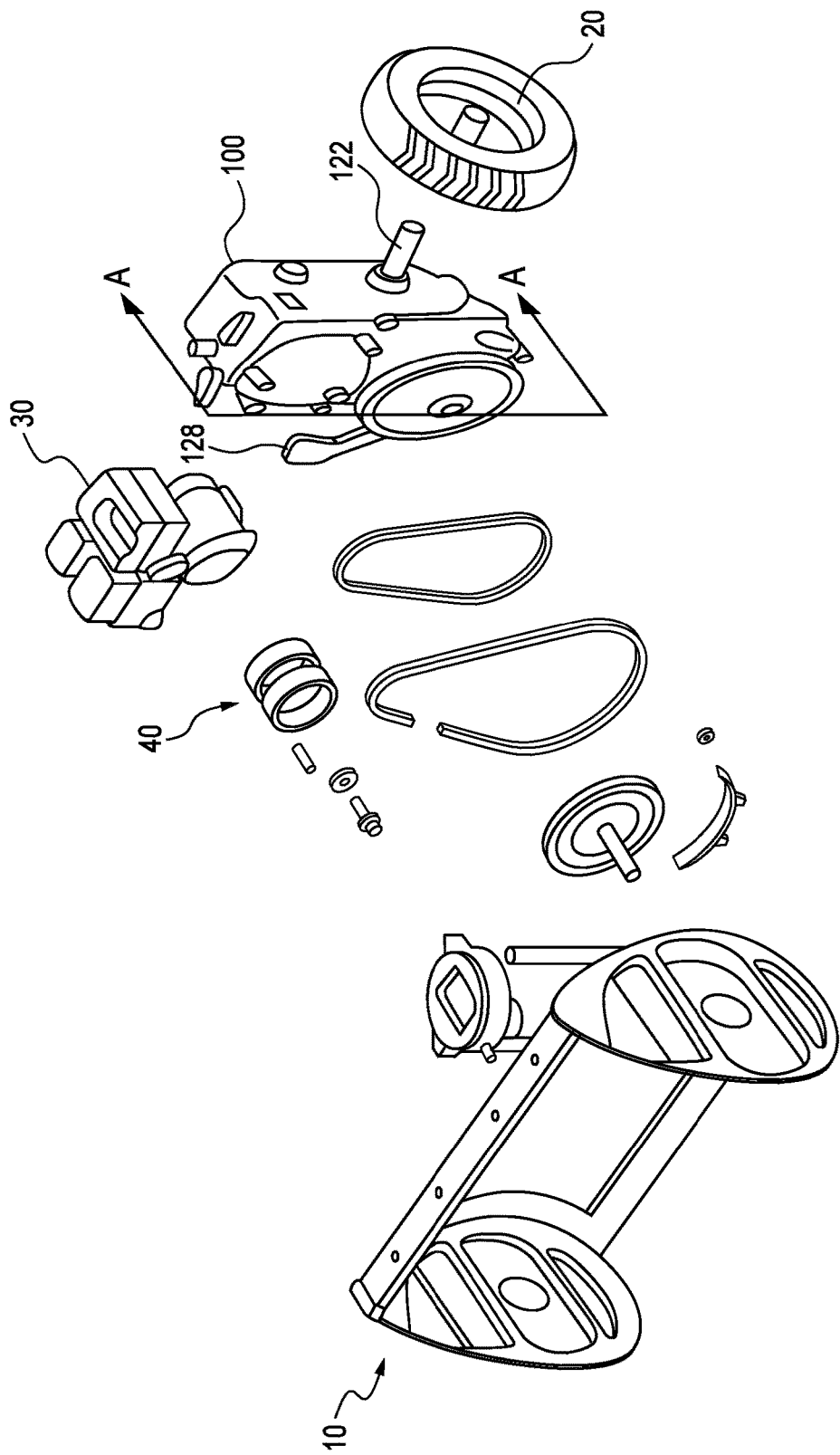
FIG. 2 is an exploded perspective view of a drive train of the portable power equipment apparatus of FIG. 1.
Figure 3:
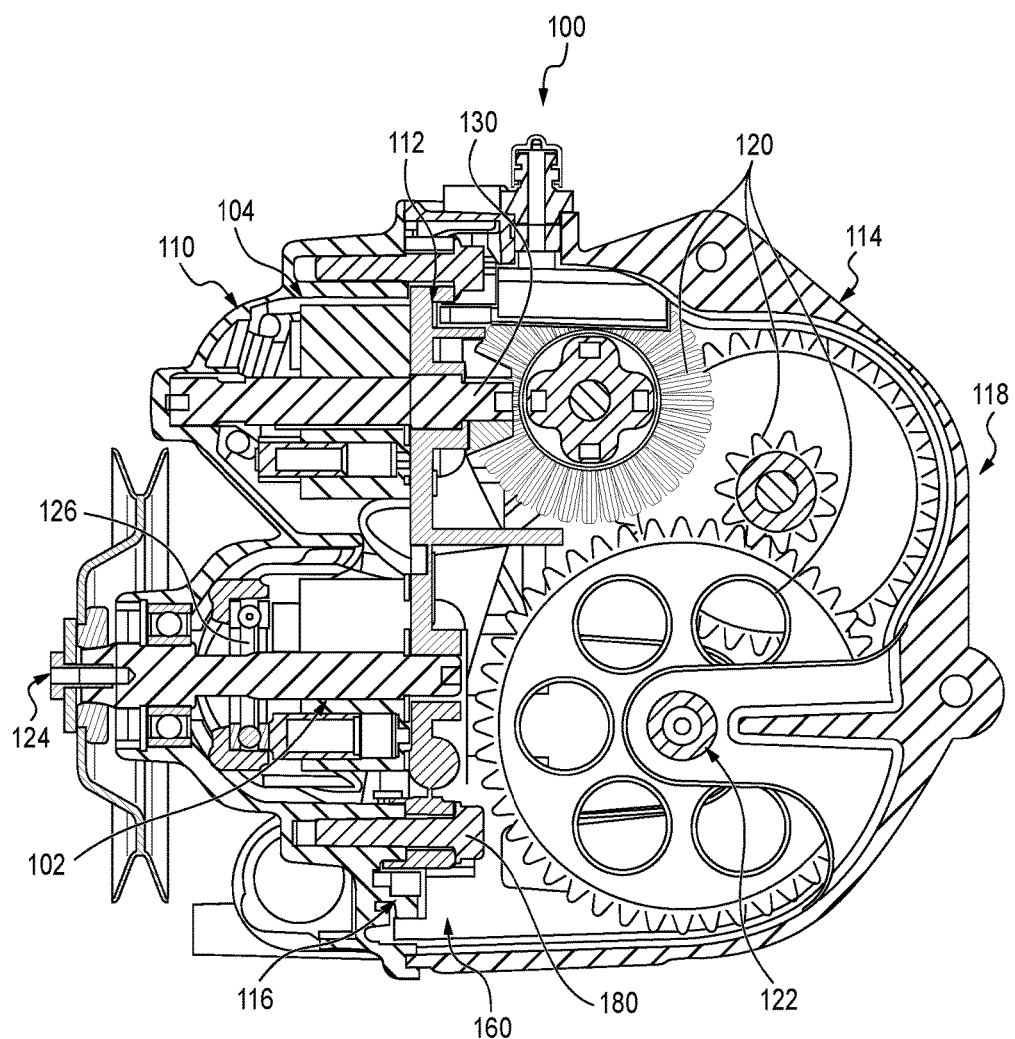
FIG. 3 is a cross-section of a hydrostatic transmission taken along Section A-A of FIG. 2 presenting a side view.
Figure 4:
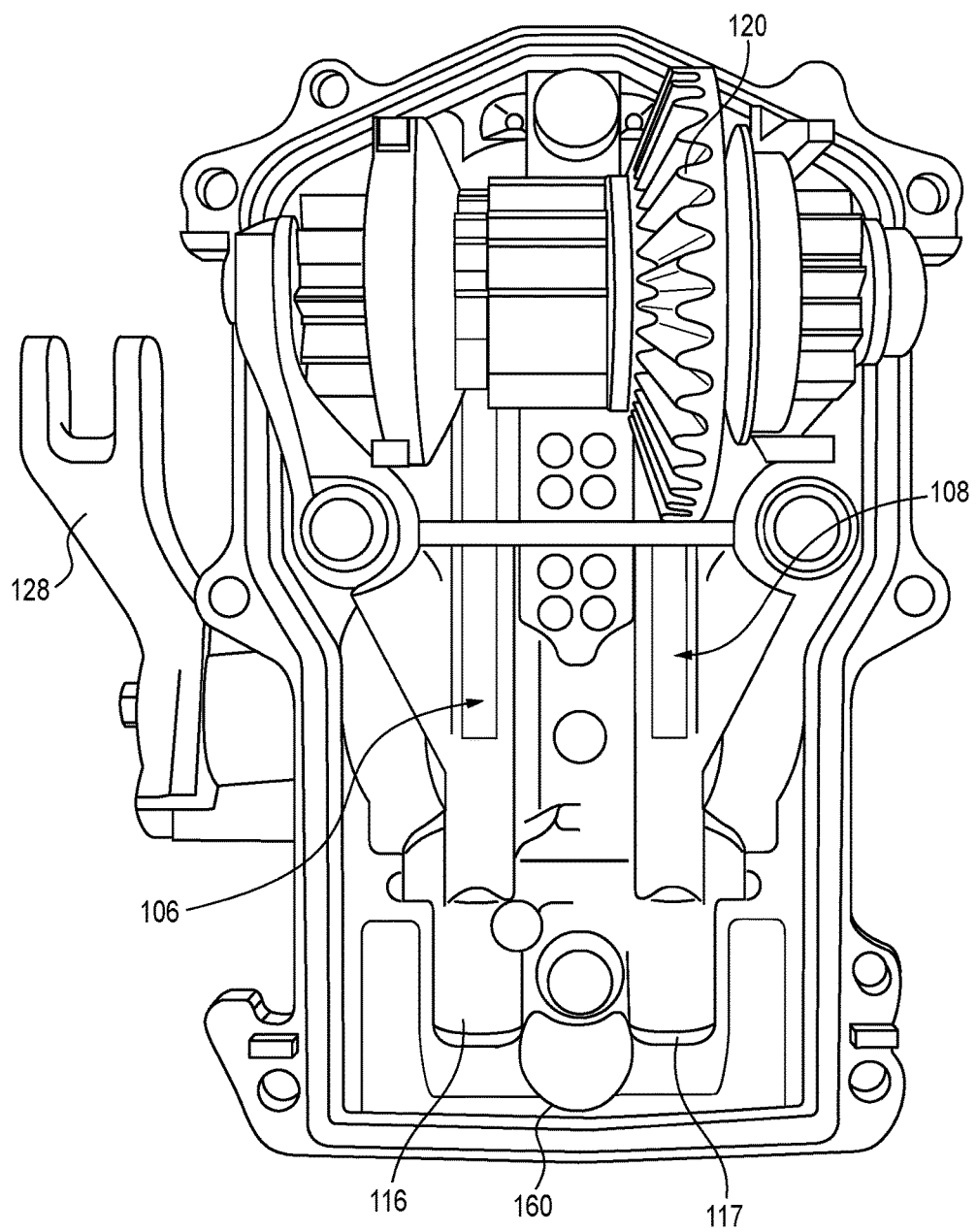
FIG. 4 is a rear view of the hydrostatic transmission with the main housing removed.
Figure 5:
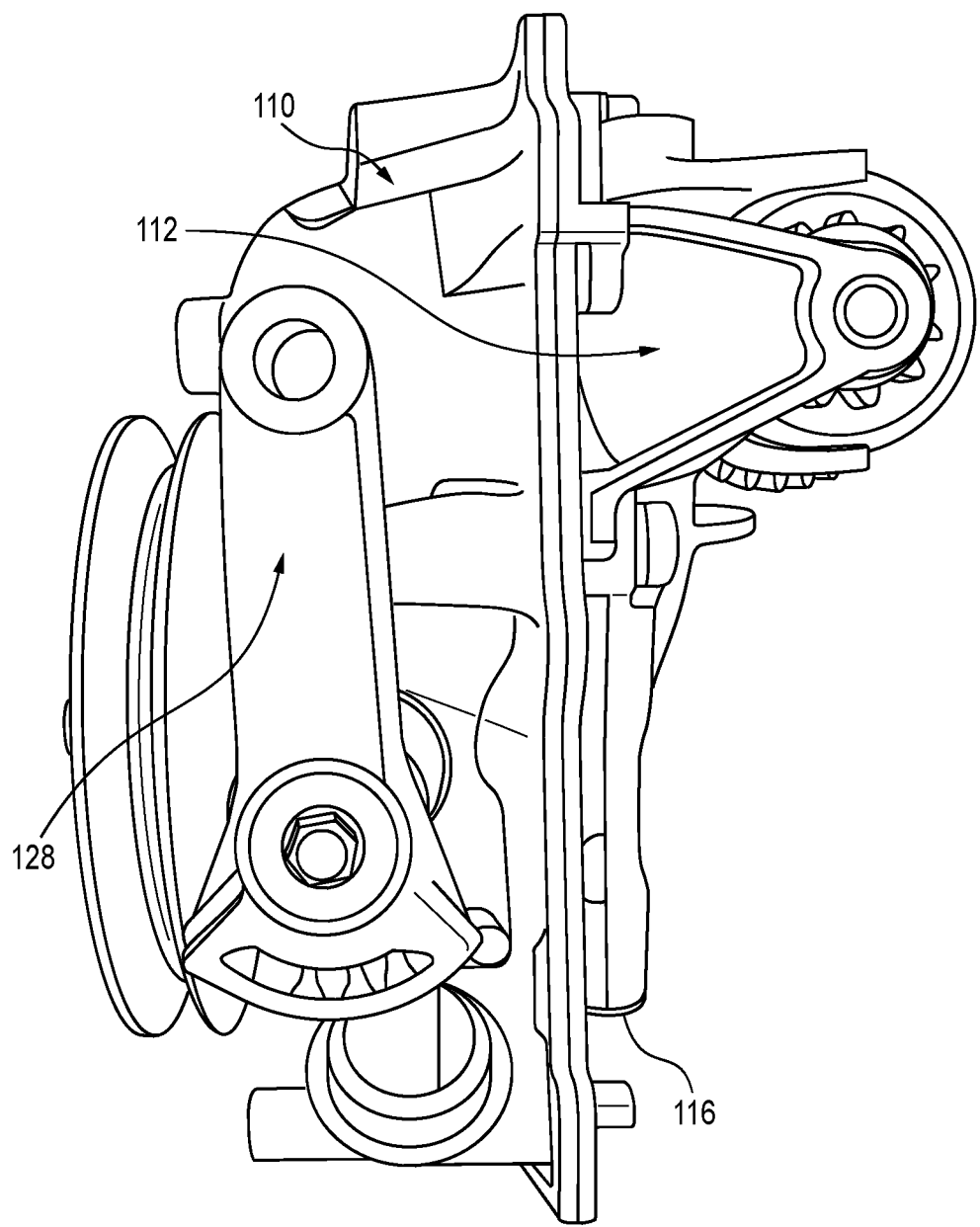
FIG. 5 is a side view of the hydrostatic transmission with the main housing removed.

FIG. 1 illustrates an embodiment of portable power equipment apparatus 10, which is illustrated as a snow blower. As shown in FIG. 2, the power equipment apparatus 10 uses a hydrostatic transmission (HST) 100 of the type used with portable power equipment, such as snow blowers, lawn mowers, and similar equipment for converting torque from the engine 30 to rotation of the wheels 20. With reference to FIGS. 3-5, the HST 100 includes a hydraulic pump 102 in fluid connection with a hydraulic motor 104. Versatility is achieved by making either or both the hydraulic pump 102 and hydraulic motor 104 variable displacement. The result is a continuously variable transmission (CVT). An HST 100 may be preferred over shifted gear transmission in many cases because of the stepless way in which the HST 100 speed ratio may be changed.

The hydraulic pump 102 and the hydraulic motor 104 form a closed hydraulic circuit. The hydraulic pump 102 is externally driven by the engine 30 of the power equipment apparatus 10. The hydraulic pump 102 generates a flow of hydraulic fluid, which in turn drives the hydraulic motor 104. The hydraulic fluid is circulated between the hydraulic pump 102 and the hydraulic motor 104 by two lines, a first hydraulic line 106 and a second hydraulic line 108. When the intention is to move the power equipment apparatus 10 forward, the first hydraulic line 106 is a high pressure line for driving the hydraulic motor 104, and the second hydraulic line 108 is a low pressure line. When the intention is to move the power equipment apparatus 10 in a reverse direction, the second hydraulic line 108 becomes the high pressure line in order to drive the hydraulic motor 104 in the opposite direction, and the first hydraulic line 106 becomes the low pressure line.

The HST 100 can be broken down into three main components: a cover 110, a center section 112, and a main housing 114. The cover 110 represents the front portion of the HST 100 and provides the structure and housing for the hydraulic system in the center section 112. The center section 112 defines the hydraulic circuit and is the location of the hydraulic pump 102, the hydraulic motor 104, the first and second hydraulic lines 106, 108, and the check valves 116, 117. The main housing 114 defines the gearbox 118 of the HST 100. The gears 120 of the gearbox 118 reduce the output of the hydraulic motor 104 to the output shaft 122, which turns the wheels 20 of the power equipment apparatus 10.

The input shaft 124 of the HST 100 is turned by a V-belt and pulley system 40 coupled to the engine 30 as shown in FIG. 2. The hydraulic pump 102 is turned by the input shaft 124. Rotation of the input shaft 124, and thus the hydraulic pump 102, is held at a constant speed and direction by the engine 30.

Figure 6A:
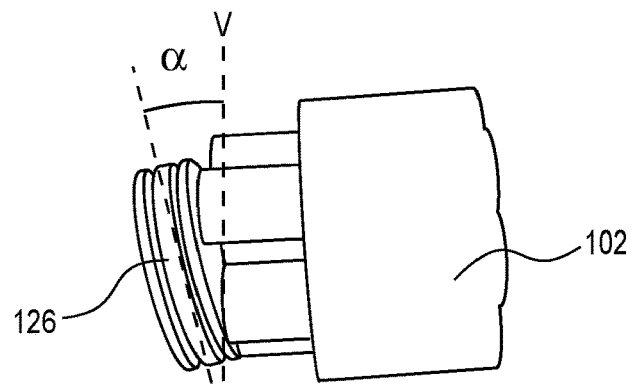
FIG. 6A is a view of a swash plate and hydraulic pump with the swash plate angled for movement in a forward direction.
Figure 6B:
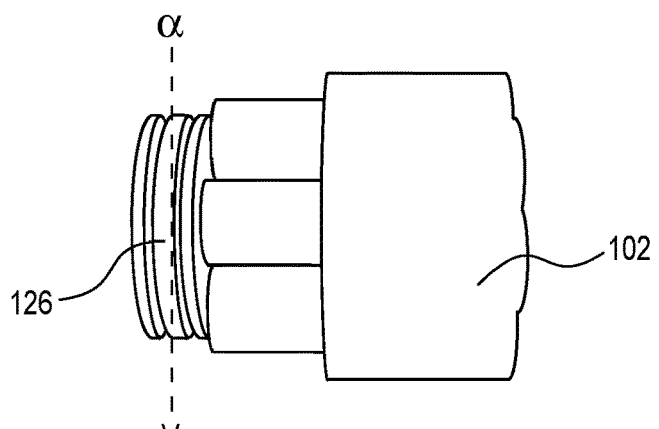
FIG. 6B is a view of the swash plate and hydraulic pump with the swash plate angled for neutral operation.
Figure 6C:
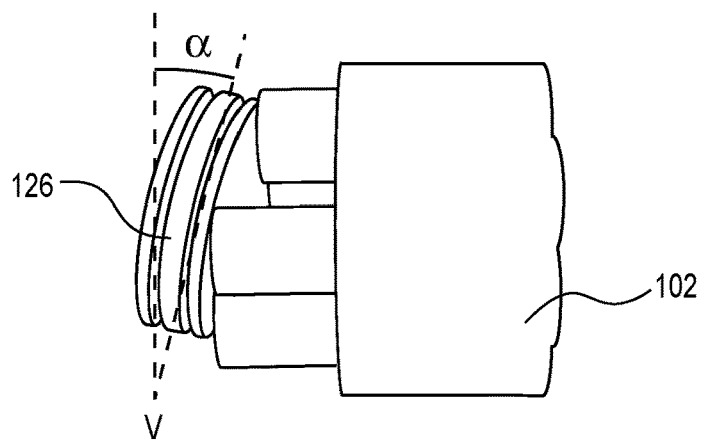
FIG. 6C is a view of the swash plate and hydraulic pump with the swash plate angled for movement in a rearward direction.

A swash plate 126 is provided that is connected to the hydraulic pump 102 that is operated by a swash plate lever 128. As shown in FIGS. 6A-6C, the angle α of the swash plate 126 determines the direction of fluid flow. The angle α of the swash plate 126 alters the pressures in the first and second hydraulic lines 106, 108 in the center section 112. As an example, in FIG. 6A, the angle α is to the left of vertical v, and this represents movement in a forward direction. In FIG. 6B, the angle α is 0° from vertical, which represents neutral. In FIG. 6C, the angle α is to the right of vertical v, and this represents movement in a rearward direction.

Figure 7:
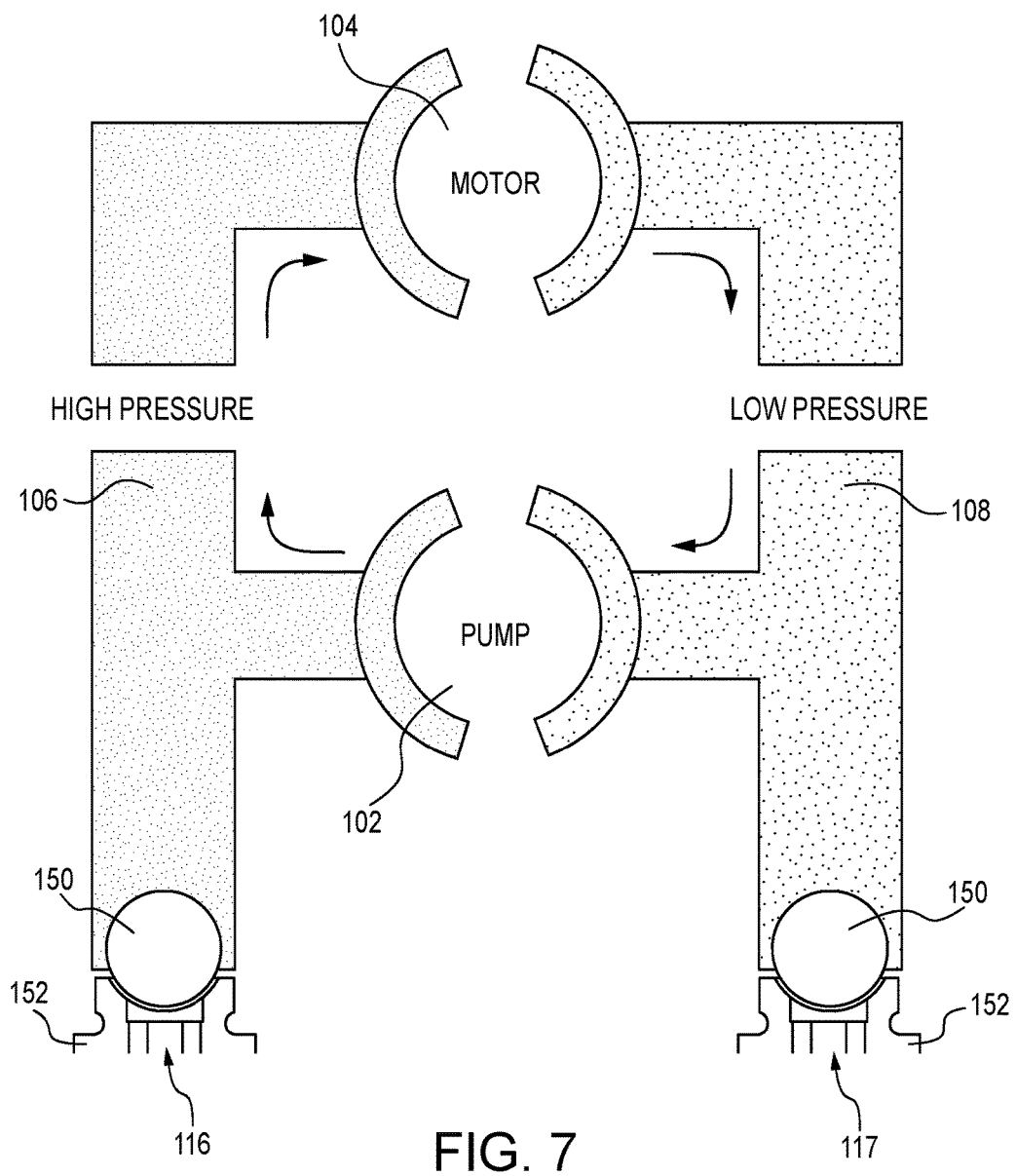
FIG. 7 is a representation of a hydraulic circuit operating in a forward direction.
Figure 8:
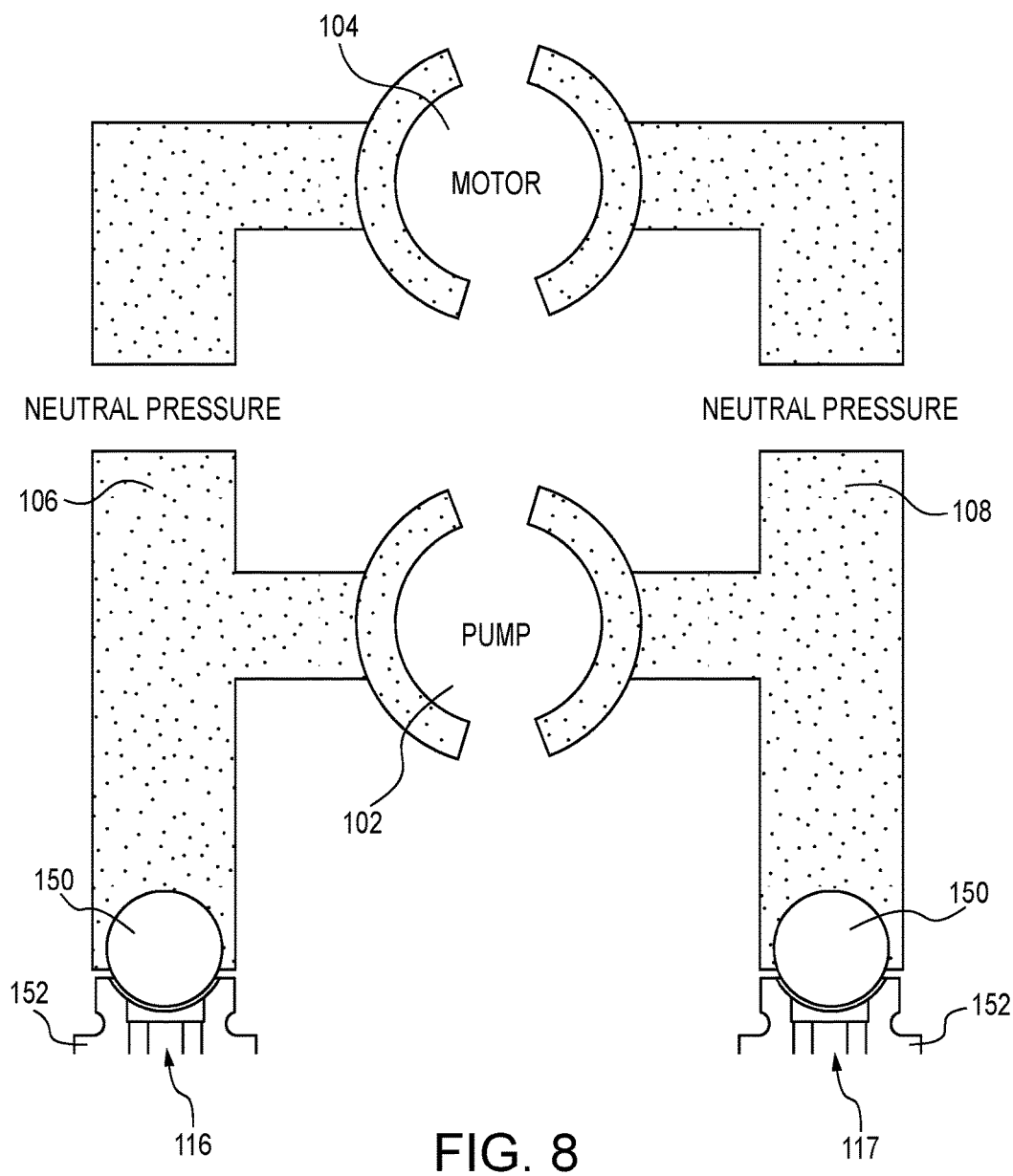
FIG. 8 is a representation of a hydraulic circuit operating in neutral.
Figure 9:
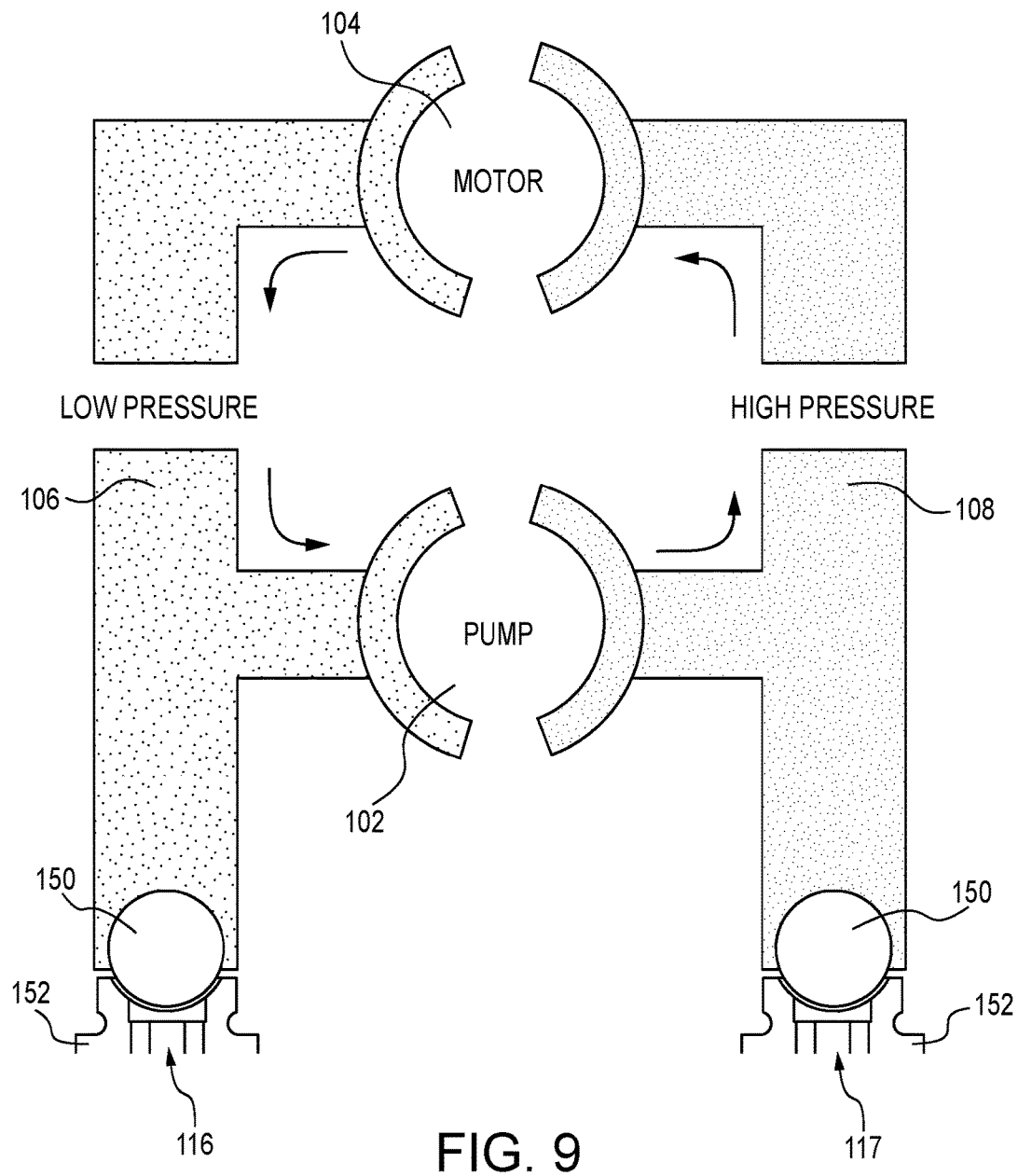
FIG. 9 is a representation of a hydraulic circuit operating in a rearward direction.

The first and second hydraulic lines 106, 108 are in fluid communication between the hydraulic pump 102 and the hydraulic motor 104. The hydraulic motor 104 turns in either a clockwise direction (forward direction, illustrated in FIG. 7, corresponding to swash plate 126 position illustrated in FIG. 6A) or counter-clockwise direction (reverse direction, illustrated in FIG. 9, corresponding to swash plate 126 position illustrated in FIG. 6C) depending on the pressure differences in the first and second hydraulic lines 106, 108 created by the swash plate 126. In the case where the swash plate 126 is vertical, pressure is equalized between the first and second hydraulic lines 106, 108 and the hydraulic motor 104 does not rotate (neutral position, illustrated in FIG. 8, corresponding to swash plate 126 position illustrated in FIG. 6B). The rotational speed of the hydraulic motor 104 is also related to the angle α of the swash plate 126. The greater the angle α of the swash plate 126, the faster the hydraulic motor 104 rotates. Finally, the motor shaft 130 meshes with the gears 120 in the main housing 120 to turn the output shaft 122, which in turn drives the wheels 20 of the power equipment apparatus 10.

Figure 10:
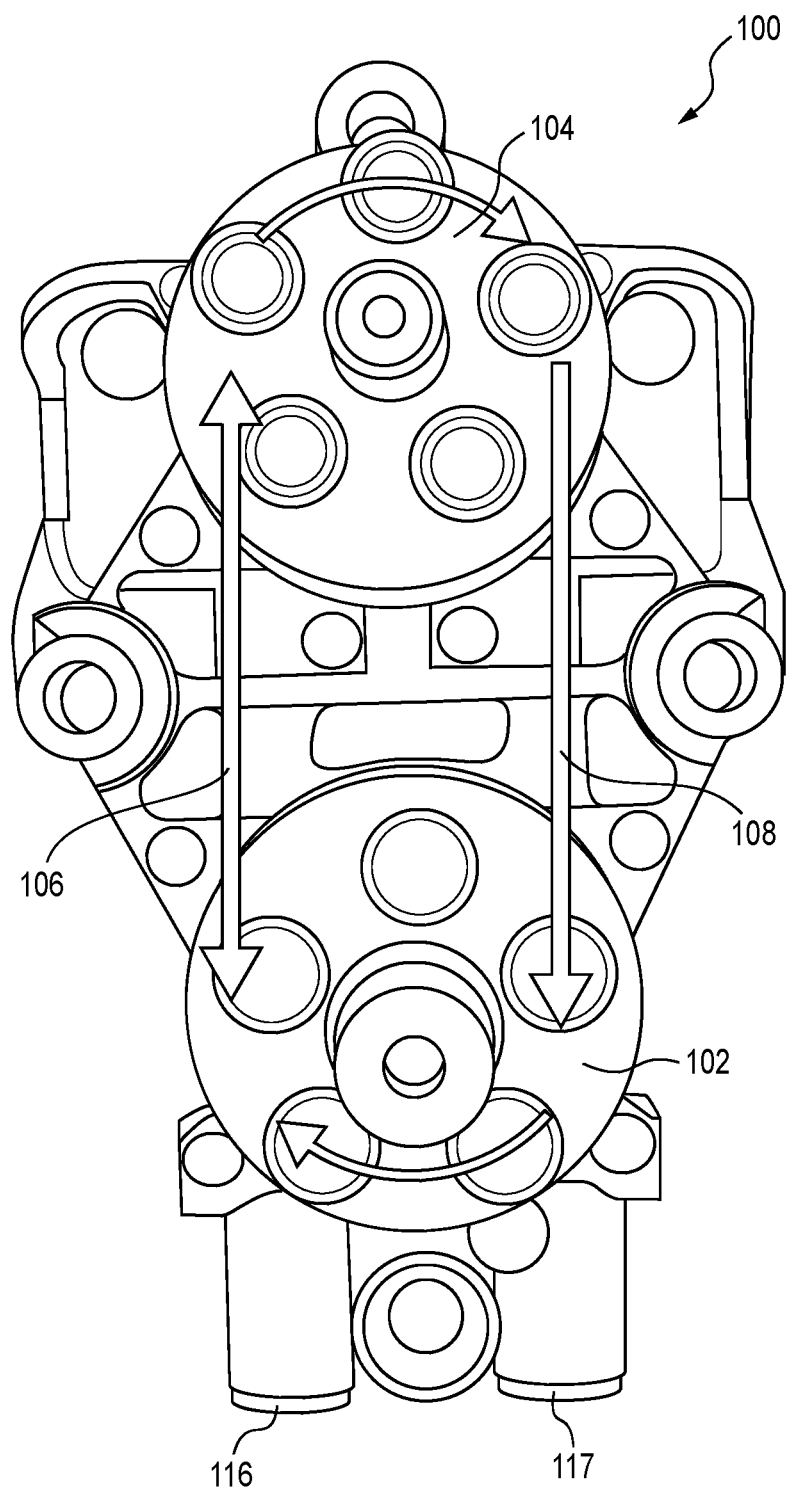
FIG. 10 is a front view of the hydrostatic transmission with the cover removed.
Figure 11:
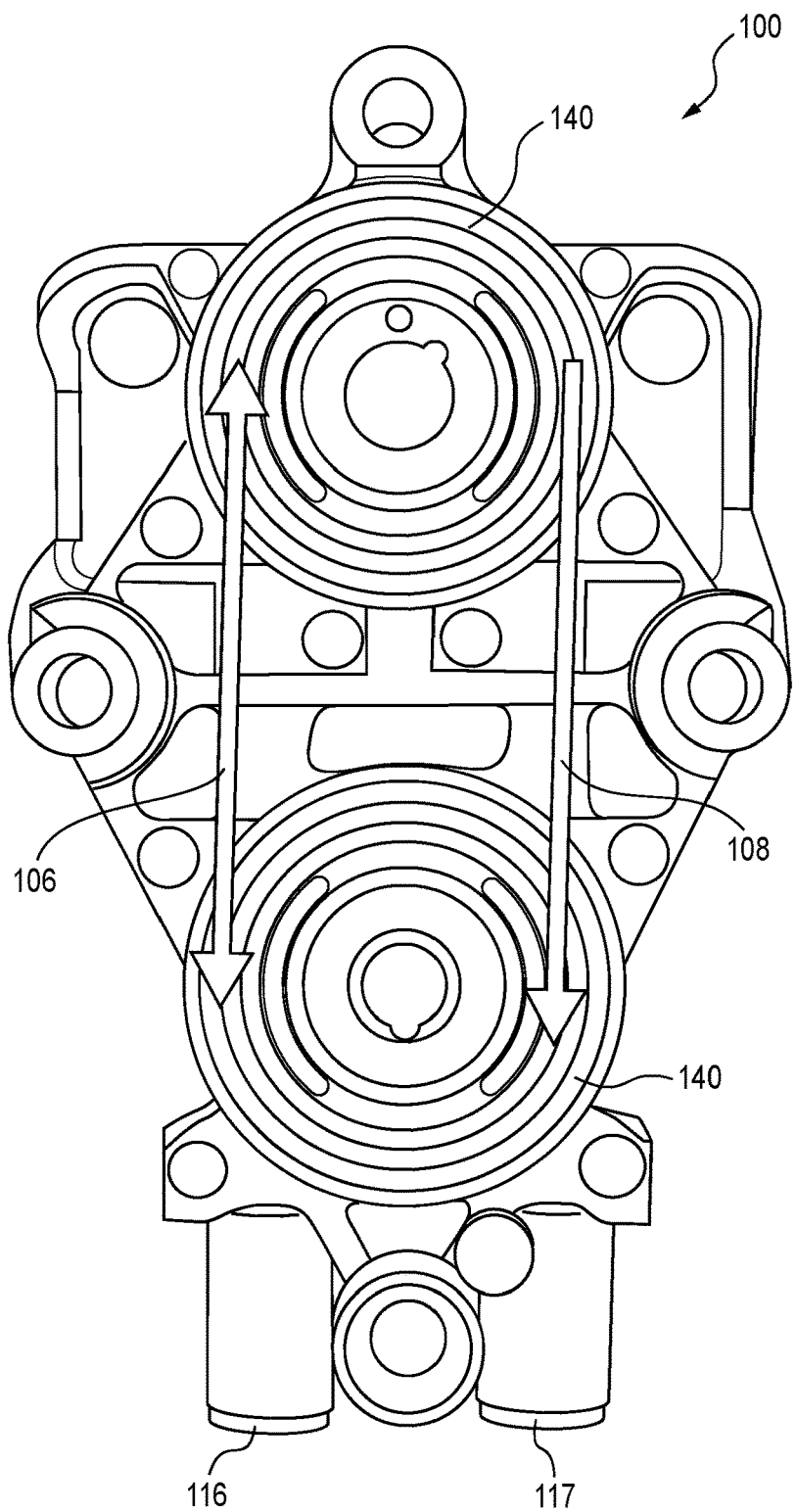
FIG. 11 is a front view of the hydrostatic transmission with the cover, the hydraulic pump, and the hydraulic motor removed to show the center section and the pump faces.
Figure 12:
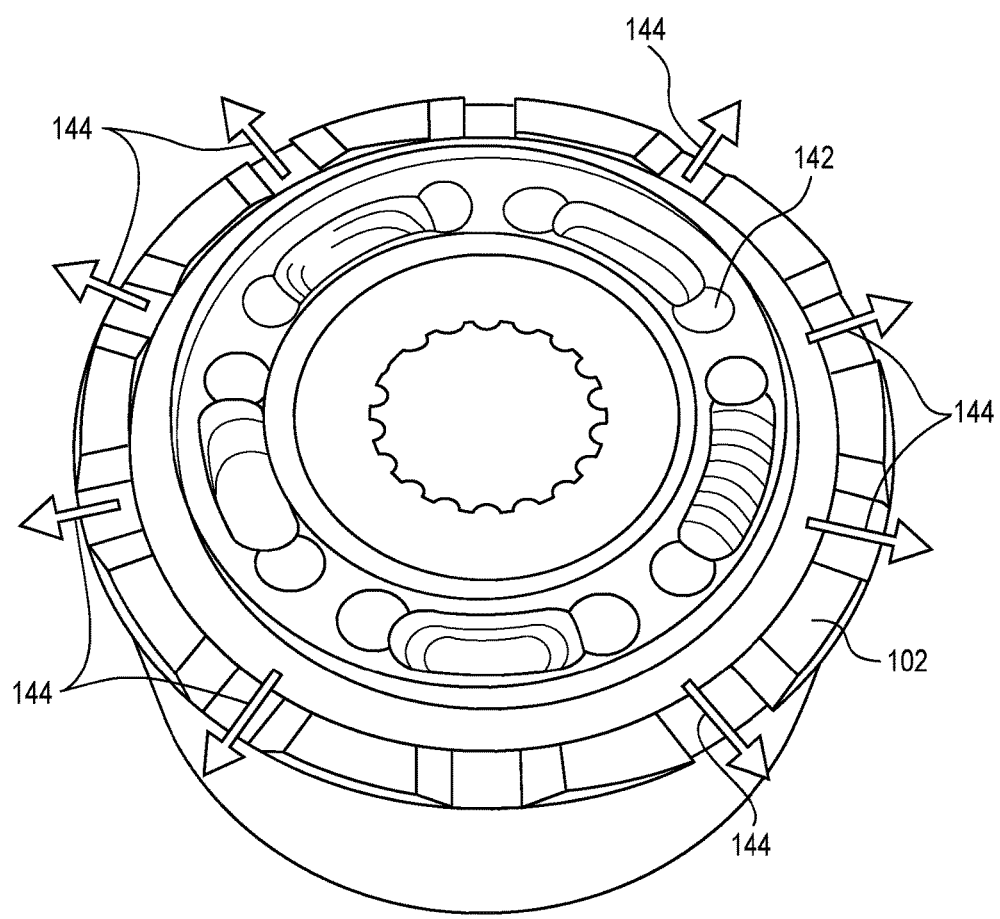
FIG. 12 is a top perspective view of the hydraulic pump showing the pump block face.

Throughout the forward and reverse movement of the swash plate lever 128, the pressure in each of the first and second hydraulic lines 106, 108 changes relative to the angle α of the swash plate 126. In an ideal situation, once the hydraulic circuit is filed with hydraulic fluid, no loss would occur. As shown in FIGS. 10-12, the pump block face 142, which is the sealing surface of hydraulic pump 102 illustrated in FIG. 12, and which has an identical shape on the hydraulic motor 104 which is not illustrated, and the pump face 140 for each of the hydraulic pump 102 and hydraulic motor 104 located on center section 112 are each machined surfaces that rotate against one another. The sealing surface between the pump block face 142 and pump face 140 keeps the hydraulic fluid within the hydraulic pump 102 and hydraulic motor 104 reasonably well, but as increasing loads are applied to the HST output shaft 122, hydraulic fluid is lost through the sealing surface due to the high pressure spikes in the hydraulic circuit. The pump block face 142 further includes oil flow paths 144 that allow hydraulic fluid to flow out during a high pressure spike. The amount of hydraulic fluid lost through the sealing surface is proportionally related to the torque applied to the output shaft 122.

When hydraulic fluid is lost through pump block face 142 of the hydraulic pump 102 and hydraulic motor 104, make up hydraulic fluid is added to the hydraulic circuit through one of two check valves 116, 117, in particular the one of the check valves 116, 117 that is associated with the low pressure line of the first and second hydraulic lines 106, 108, depending on the direction of operation of the HST 100 at the time. For example, in the forward direction example illustrated in FIG. 7, hydraulic fluid may be added through check valve 117. In the rearward direction example illustrated in FIG. 9, hydraulic fluid may be added through check valve 116. The check valves 116, 117 ball and seat valves known to those skilled in the art. Pressure of the fluid in the first and second hydraulic lines 106, 108 presses the ball 150 into the seat 152, but if the pressure in the low pressure line of the first and second hydraulic lines 106, 108, the ball 150 is raised and fluid enters until pressure raises high enough to force the ball 150 back into the seat 152.

Figure 13:
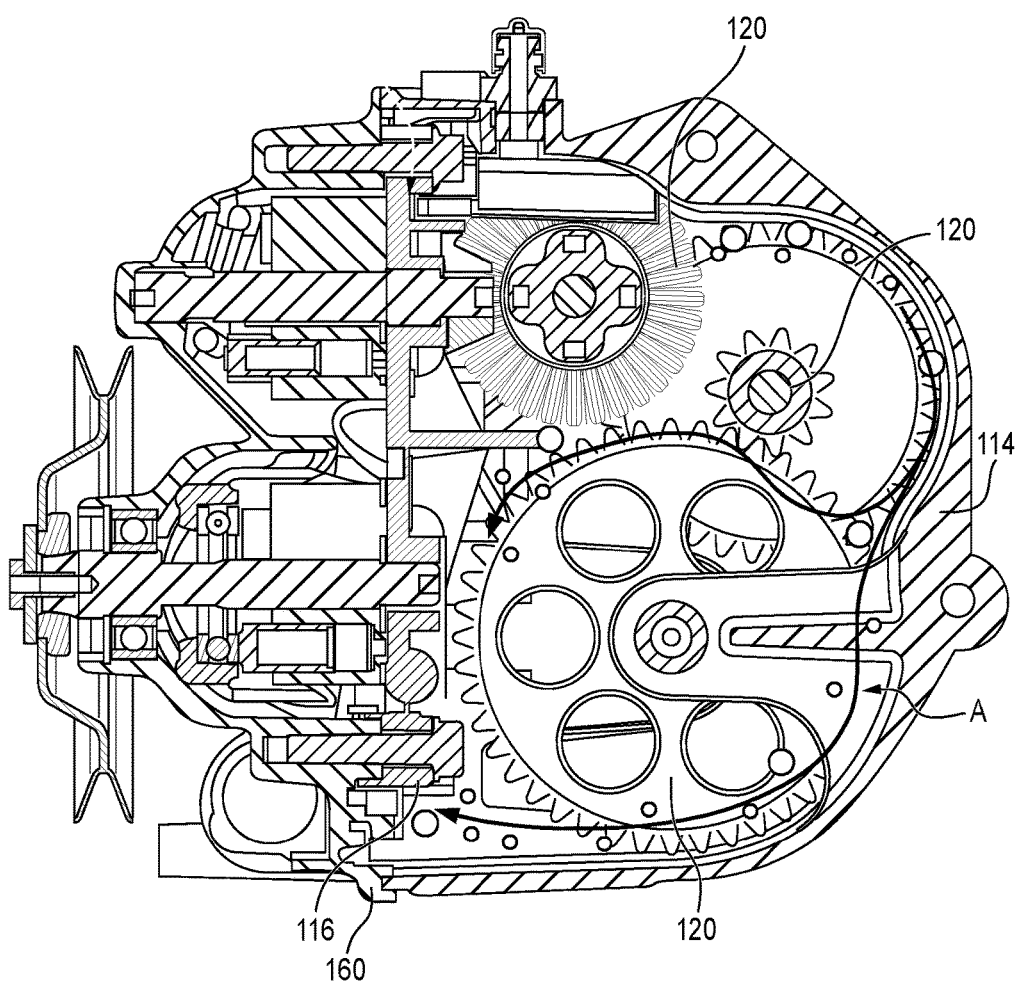
FIG. 13 is the cross-section view of a hydrostatic transmission taken along Section A-A of FIG. 2 showing the direction of hydraulic fluid flow in the hydrostatic transmission
Figure 14:
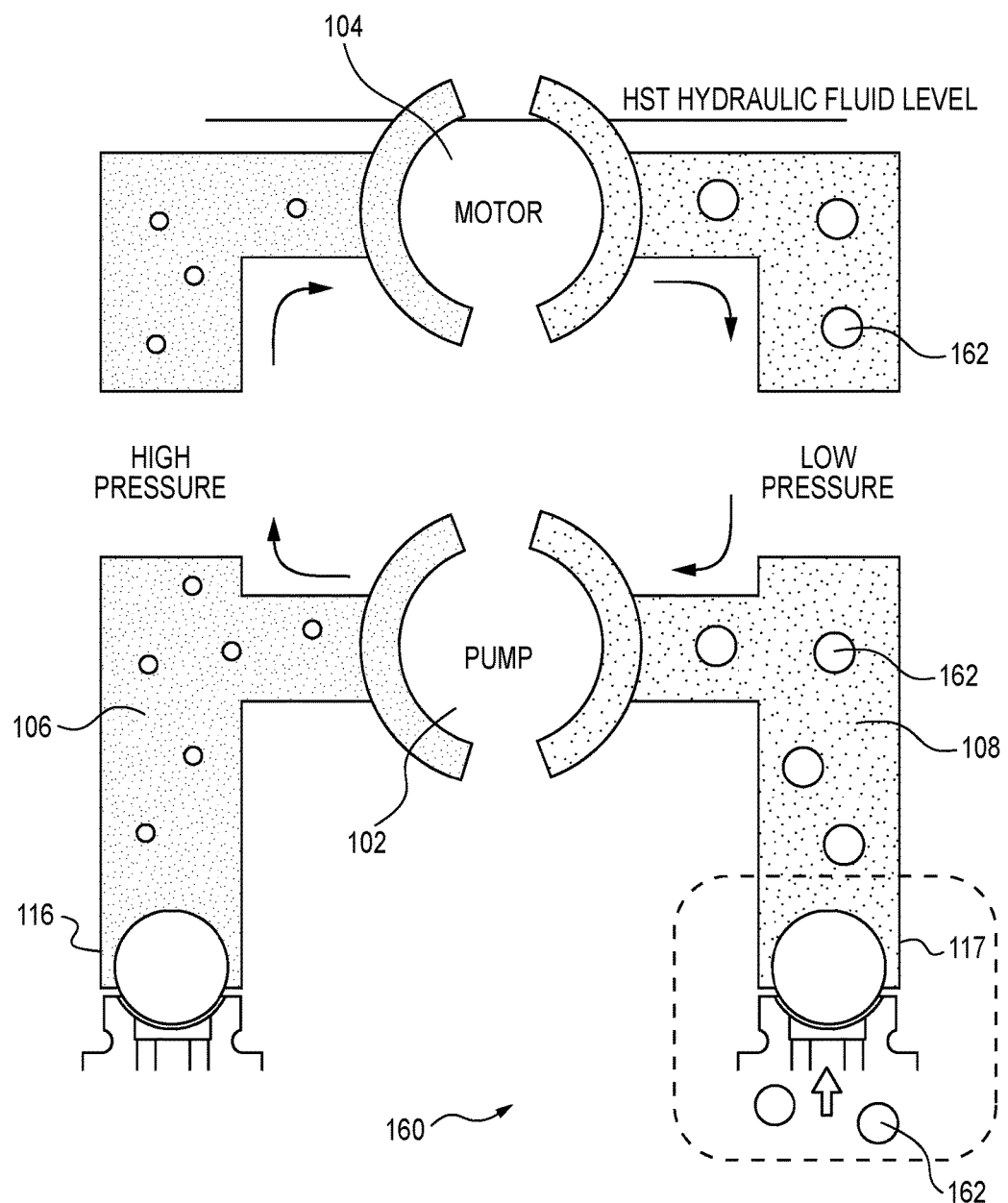
FIG. 14 is a representation of a hydraulic circuit operating in a forward direction with entrained cavitation bubbles.

With reference to FIG. 13, when the hydraulic fluid exits the hydraulic circuit, it passes through the gears 120 in the main housing 114. The churning of the hydraulic fluid through the gears 120 causes cavitation, or the introduction of pockets of air or air bubbles, called cavitation bubbles 162, into the hydraulic fluid. The drive gears 120 in the main housing 114 directs hydraulic fluid entrained with cavitation bubbles 162 to the uptake area 160 of the check valves 116, 117, as illustrated by arrow A. The cavitation bubbles 162 may become trapped under the check valves 116, 117 in the uptake area 160 and may operate to restrict the flow of hydraulic fluid into the first or second hydraulic lines 106, 108. With reference to FIG. 14, when the hydraulic fluid does enter the first or second hydraulic lines 106, 108, whichever is the low pressure line at the time, and enter into the hydraulic circuit, the hydraulic fluid in the hydraulic circuit is entrained with cavitation bubbles 162, which limits the flow of the hydraulic fluid in the circuits and may limit the efficiency of the hydraulic circuit by reducing the pressure in the circuits. Air is easily compressible so the proper pressure in the circuit to turn the hydraulic motor 104 is not obtainable.

Figure 15:
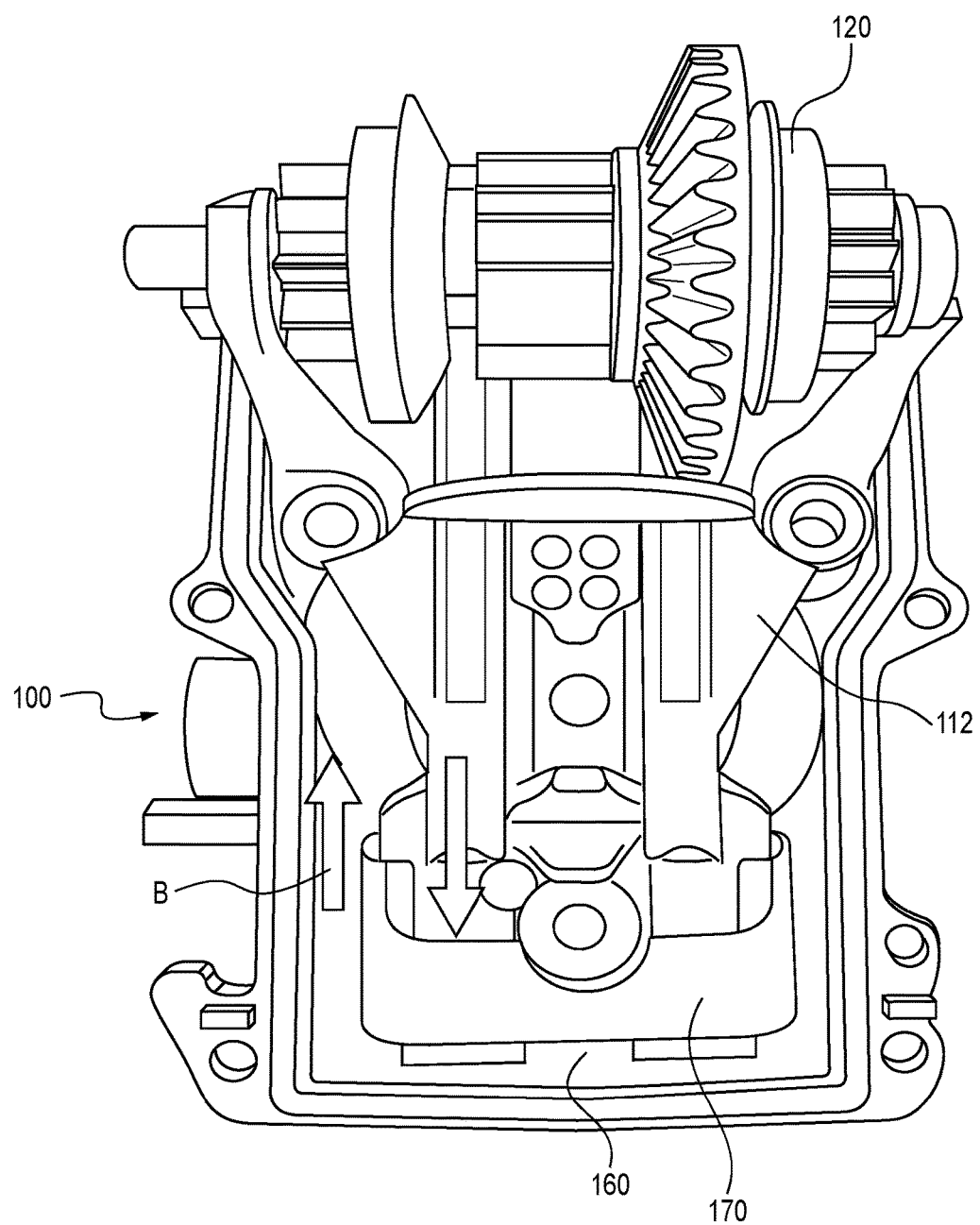
FIG. 15 is a rear view of the hydrostatic transmission with the main housing removed and an entrained air deflector installed.
Figure 16:
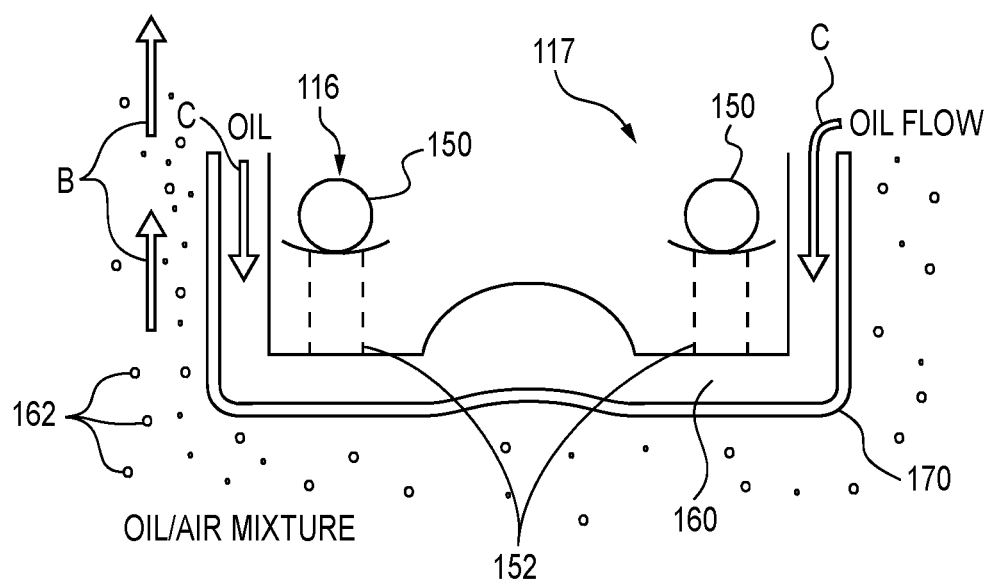
FIG. 16 is a plan view illustrating the operation of the entrained air deflector.
Figure 17:
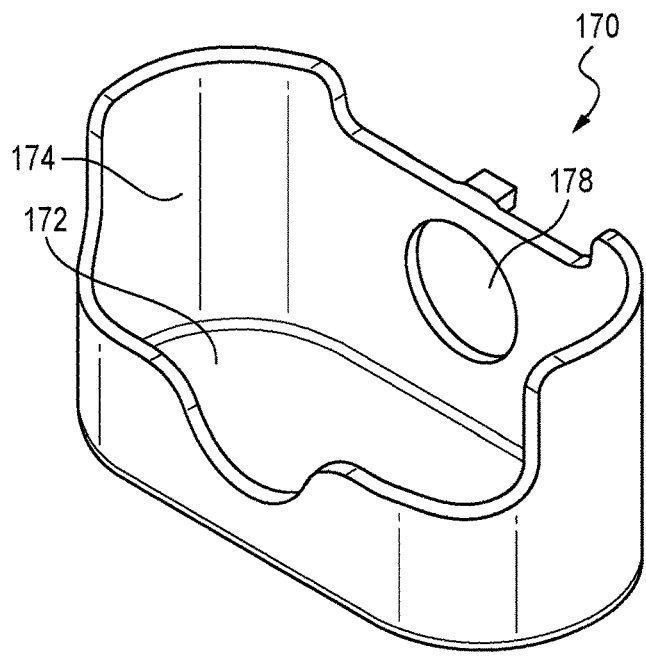
FIG. 17 is a perspective view of an embodiment of the entrained air deflector.
Figure 18:
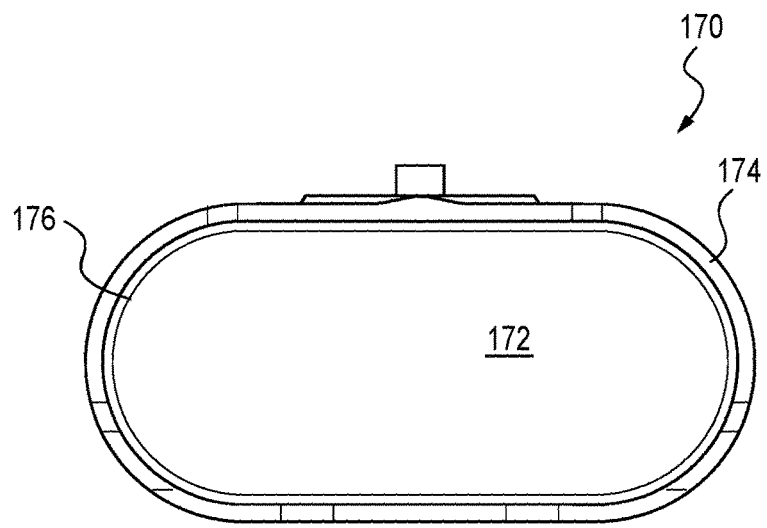
FIG. 18 is a top view of the embodiment of the entrained air deflector.
Figure 19:
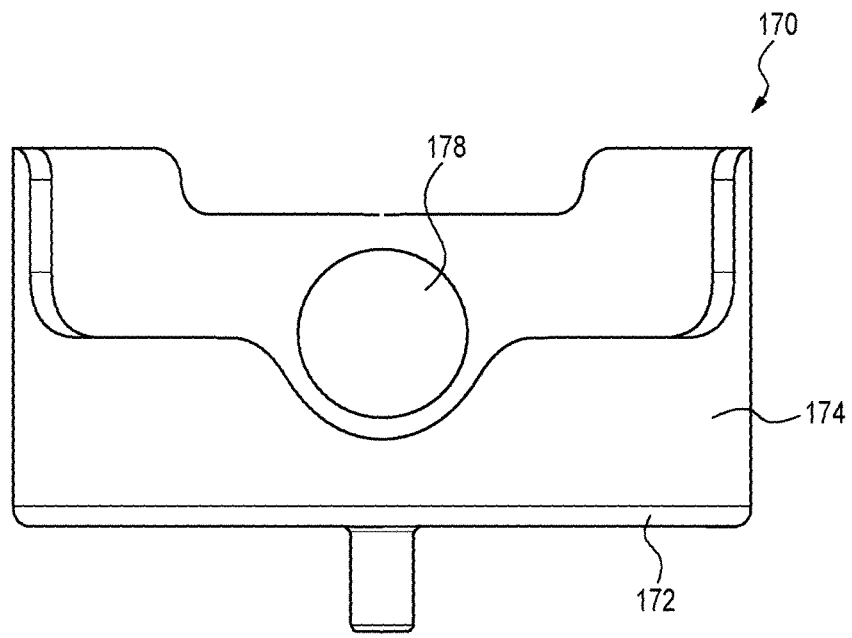
FIG. 19 is a front view of the embodiment of the entrained air deflector.
Figure 20:
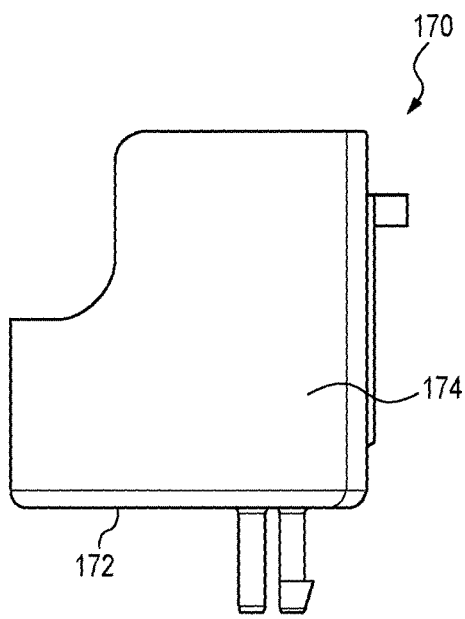
FIG. 20 is a side view of the embodiment of the entrained air deflector.

As illustrated in FIG. 15, which shows the HST 100 with the main housing In order to prevent the introduction of hydraulic fluid entrained with cavitation bubbles 162 into the check valves 116, 117, an entrained air deflector 170 is provided. The entrained air deflector 170 prevents the flow of hydraulic fluid entrained with cavitation bubbles 162 into the check valve uptake area 160 by directing hydraulic fluid entrained with cavitation bubbles 162 away from the uptake area 160. As illustrated in FIG. 16, the entrained air deflector 170 is placed around the seats 152 of the check valves 116, 117 to allow hydraulic fluid entrained with cavitation bubbles 162 to flow around the entrained air deflector 170 in the direction of arrow B upward due to the cavitation bubbles 162 in the hydraulic fluid. Thus, lighter hydraulic fluid entrained with cavitation bubbles 162 will rise while the heavier non-entrained hydraulic fluid will flow around the entrained air deflector 170 in the direction of arrow C towards the uptake area 160 to prevent the seats 152 from trapping or ingesting cavitation bubbles 162. The entrained air deflector 170 is of a rectangular or oval-type shape and attaches near the check valve uptake area 160. The entrained air deflector 170 encases the check valve uptake area 160 and protects the check valve seats 152 from hydraulic fluid entrained with cavitation bubbles 162.

Figure 21:
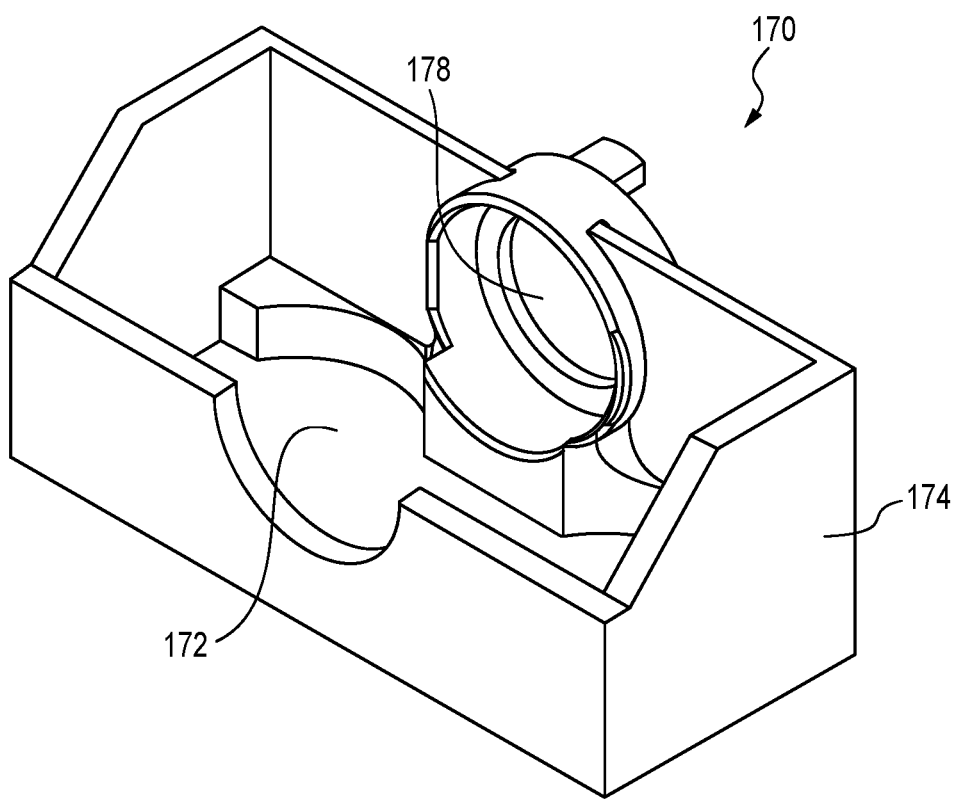
FIG. 21 is a perspective view of an alternate embodiment of the entrained air deflector.

FIGS. 17-21 illustrate embodiments of the entrained air deflector 170. In each embodiment, the entrained air deflector 170 includes a floor 172 positioned beneath the first check valve 116 and the second check valve 117. A wall 174 extends perpendicularly upward from an outer edge 176 of the floor 172. The wall 174 radially surrounds the first check valve 116 and the second check valve 117. Further, the wall 174 may include an attachment hole 178 through which a fastener (not shown) may be passed. The fastener may be any fastener known to those skilled in the art, including but not limited to bolts, rivets, magnetic fasteners, or the like. Alternatively, the hole 178 may facilitate the entrained air deflector 170 being affixed to an extension 180 on the center section 112 of the HST 100 as shown in FIG. 3. The entrained air deflector 170 may be made of any suitable thermoplastic material, such as a glass-filled polymer, which may be glass-filled nylon. FIG. 21 illustrates an alternate embodiment of the entrained air deflector which is squarer, as opposed to the rounder embodiment illustrated in FIGS. 17-20.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A hydrostatic transmission for a working machine having a frame, an engine on the frame, and at least one wheel driven by the hydrostatic transmission, comprising:
   a housing;
   a hydraulic pump, the hydraulic pump driven by an output shaft from the engine;
   a hydraulic motor for driving an output shaft connected to the at least one wheel;
   a first fluid line fillable with hydraulic fluid to be maintained under a first pressure;
   a second fluid line fillable with hydraulic fluid to be maintained under a second pressure;
   a first check valve for allowing hydraulic fluid to enter the first fluid line;
   a second check valve for allowing hydraulic fluid to enter the second fluid line; and
   an entrained air deflector for preventing hydraulic fluid entrained with air from entering the first check valve and the second check valve, the entrained air deflector comprising:
      a floor, the floor having an outer edge, the floor being positioned beneath the first check valve and the second check valve; and
      a wall extending perpendicularly upward from the outer edge of the floor, the wall radially surrounding the first check valve and the second check valve.

2. The hydrostatic transmission of claim 1 wherein the wall of the entrained air deflector includes an opening for receiving a fastener.

3. The hydrostatic transmission of claim 2 wherein the entrained air deflector is comprised of a glass-filled polymer.

4. The hydrostatic transmission of claim 3 wherein the glass-filled polymer is glass-filled nylon.

5. A hydrostatic transmission for a working machine having a frame, an engine on the frame, and at least one wheel driven by the hydrostatic transmission, comprising:
   a housing;
   a hydraulic pump, the hydraulic pump driven by an output shaft from the engine for pumping hydraulic fluid;
   a hydraulic motor for driving an output shaft connected to the at least one wheel;
   a first fluid line transporting hydraulic fluid between the hydraulic pump and the hydraulic motor under a first pressure;
   a second fluid line transporting hydraulic fluid between the hydraulic pump and the hydraulic motor under a second pressure;
   a first check valve for allowing hydraulic fluid to enter the first fluid line; and
   a deflector for preventing hydraulic fluid entrained with air from entering the first check valve, the deflector comprising:
      a floor, the floor having an outer edge, the floor being positioned beneath the first check valve; and
      a wall extending upwardly from the outer edge of the floor, the wall radially surrounding the first check valve.

6. The hydrostatic transmission of claim 5 further comprising:
   a second check valve for allowing hydraulic fluid to enter the second fluid line.

7. The hydrostatic transmission of claim 6 wherein the deflector prevents hydraulic fluid entrained with air from entering the second check valve.

8. The hydrostatic transmission of claim 7 wherein:
   the floor of the deflector is further positioned beneath the second check valve; and
   the wall of the deflector further radially surrounds the second check valve.

9. The hydrostatic transmission of claim 8 wherein the wall of the deflector includes an opening for receiving a fastener.

10. The hydrostatic transmission of claim 9 wherein the deflector is comprised of a glass-filled polymer.

11. The hydrostatic transmission of claim 10 wherein the glass-filled polymer is glass-filled nylon.

12. The hydrostatic transmission of claim 8 wherein hydraulic fluid comprises:
   air entrained hydraulic fluid; and
   non-entrained hydraulic fluid.

13. The hydrostatic transmission of claim 12 wherein air entrained hydraulic fluid rises around the deflector.

14. The hydrostatic transmission of claim 13 wherein non-entrained hydraulic fluid flows over the wall of the deflector onto the floor of the deflector.

15. The hydrostatic transmission of claim 14 wherein non-entrained hydraulic fluid comes into fluid contact with the first check valve and the second check valve.

* * * * *